United States Patent [19]
Umlauf

[11] Patent Number: 5,217,103
[45] Date of Patent: Jun. 8, 1993

[54] CONVEYOR

[76] Inventor: Norbert Umlauf, Haferkamp 64, 5800 Hagen 1, Fed. Rep. of Germany

[21] Appl. No.: 816,631

[22] Filed: Dec. 31, 1991

[30] Foreign Application Priority Data

Jan. 15, 1991 [DE] Fed. Rep. of Germany ....... 4100926

[51] Int. Cl.⁵ .............................................. B65G 47/46
[52] U.S. Cl. .................................... 198/365; 198/837; 198/838; 198/841
[58] Field of Search ............... 198/365, 837, 838, 841, 198/845

[56] References Cited

U.S. PATENT DOCUMENTS

| 1,699,764 | 1/1929 | Solem | 198/837 |
| 1,774,447 | 8/1930 | Marchand et al. | 198/365 |
| 3,314,526 | 4/1967 | Franek et al. | 198/838 |
| 3,986,596 | 10/1976 | Hamilton | 198/365 |
| 4,358,010 | 11/1982 | Besch | 198/838 |

Primary Examiner—Joseph E. Valenza
Attorney, Agent, or Firm—Anderson Kill Olick & Oshinsky

[57] ABSTRACT

With a conveyor, in particular a positioning conveyor, having a driven chain system, higher transporting speeds, together with longer service life and less noise nuisance, are made possible by supporting the chain system on an endless runway.

18 Claims, 8 Drawing Sheets

CONVEYOR

TECHNICAL FIELD OF THE INVENTION

The invention relates to a conveyor, in particular a positioning conveyor, having a driven chain system.

BACKGROUND OF THE INVENTION AND PRIOR ART

A conveyor of this kind, in which two parallel endless chains, spaced apart and joined together by cross struts to form a chain system, are driven by chain wheels, and including a distributor for items being conveyed that has followers engaging in guide rails and is forcibly displaced transverse to the conveying direction while the chains are circulating, is disclosed in the brochure "STEWART HORIZONTAL SWITCHES" of the firm STEWART SYSTEMS, PLANO, TEX. It is used on very long conveying runs, e.g. up to 100 m or more in length, such as are to be found at airports or main post offices as distributing stations for packets, items of luggage or similar objects. The conveyor runs, which often comprise endlessly circulating strips of stainless steel as conveyor belts, include these positioning conveyors to divert the conveyed goods either to the left or to the right in order to effect purposive sorting, e.g. in the case of parcels sorting oriented according to the addressee. Before the item to be conveyed —for example said parcel—arrives on the positioning conveyor on the incoming end its destination is determined by means of a reading device and a switch inserted at the incoming end ahead of the multitrack guide rails that branch or fork in the conveying direction is automatically adjusted. Since the followers of the distributor, which is about half as wide as the conveyor and is made up of diverter plates, are in engagement with the switch which, like the guide rails is, for example, U-shaped, they are guided to one of the rail tracks when the switch pivots horizontally. In the case of guide rails that fork and branch into two tracks they are thus guided either into the track leading to the right or that leading to the left side of the conveyor, so that the parcel resting on the diverter plates is also correspondingly distributed either to the left or to the right. The article being conveyed always runs on the positioning conveyor at a sufficient distance from the following item.

The known positioning conveyors and conveyed article distributors are subjected to severe vibrations, only allow low transporting speeds of at most 60 m/min, and in addition generate a great deal of noise. Furthermore the service or operating life is impaired by the heavy impacts that cause the noise and occur when the diverter plates are turned round and transversely displaced. This is due on the one hand to the fact that as the diverter plates are turned at the turning points of the conveyor they overlap with a jump, since for fairly stable running conditions they are twice as wide as the pitch of the cross-struts, which are in the form of round bars. On the other hand it is impossible to avoid severe impacts when the followers, which e.g. project downwards and have plates with rollers at their ends, reach the fork where the guide rails divide to continue in the direction of transport as multiple tracks and are there abruptly forced to run in another direction. The parcels to be sorted are thereby greatly accelerated, which both impairs their alignment and leads to damage to the packaging. Finally the chain wheel drive of the known conveyor is not only prone to intense vibration but also suffers a disadvantageous polygon effect, i.e. the chain wheels twist repeatedly. Since there are altogether four chain wheels round which the chains pass at the incoming and outgoing ends, the chains lose their engagement with the chain wheels or their guides at many points; vibration is therefore unavoidable.

OBJECT OF THE INVENTION

It is an object of the invention to improve the operation of known sorting conveyors, in particular to enable shorter conveyors to be used, with higher transporting speeds and at the same time longer periods of operation and the generation of less noise, as well as obtaining improved and gentler alignment of the parcels.

BRIEF DESCRIPTION OF THE INVENTION

This object is achieved according to the invention by supporting the chain system on an endless runway. With such a completely closed runway that is curved, preferably with the exception of the straight positioning region which corresponds substantially to the whole of the horizontal path of the carrying run of the conveyor, the chain system can move with the fewest possible abrupt turns. At the same time the circulating, closed guidance and support of the chain system improves the conditions on entering and leaving the turning points. Owing to its supported guidance over the entire path the chain system, with its endlessly circulating cylindrical cross-struts carrying distributors for the articles being conveyed thereon cannot sag at any point, and is furthermore so taut that vibrations cannot build up. The running conditions and conveying speeds can likewise be considerably improved as impacts and abrupt accelerations or decelerations are avoided The chain system may be supported on the runway or on runways at each side by rollers or alternatively by sliding surfaces, e.g. runners. If lateral guide rollers are present as well as running rollers the chain system can be held exactly on its prescribed circulating path, as the lateral guide rollers can bear against and be supported by the runway or runways.

According to an advantageous embodiment of the invention the axles of the rollers are coupled together so that each conveyed articles distributor, advantageously in the form of a diverter plate, has from two to four points of support; the chain system then comprises trolley-like chain segments or roller units. This statically stable construction has the advantage of allowing the diverter plates to have a width corresponding to the pitch of the chain between the pivoting points defined by the roller axes of two adjacent diverter plates. The jumping effect described in the case of the known conveyors, that is due to the large plate widths necessary therein and has an extremely adverse effect on the running conditions, does not occur. For the conveyance of some kinds of articles it may be sufficient, instead of providing diverter plates between the cross-struts, merely to provide displaceable nubs or pushers; the mass to be displaced can in this way be reduced.

If intermediate strips which extend across the width of the distributor, are attached to the chains of the chain system and are lower than the diverter plates are arranged alternately with the diverter plates, a substantially closed table or transporting plane can be obtained. It is therefore preferable if each diverter plate adjoins an intermediate strip. Since the intermediate strips are lower than the diverter plates the article conveyed (parcel) lies only on the carrying diverter plates.

It is advantageous to provide the surface of the diverter plates with friction layers, e.g. by inserting an O-ring into a continuous groove, which provide a higher friction coefficient that helps to carry the parcels along.

Because the diverter plates and the intermediate strips are arranged to overlap at least on one longitudinal side, the chain system or the roller units can be arranged to run into the transporting plane at a tangent. At the same time the surface of the conveyor is almost entirely closed, i.e. no substantial gaps occur between the diverter plates and the intermediate strips, either in the transporting plane or in the incoming and outgoing radii in the region of the chain wheels. However, owing to the geometrical run-off conditions spaces allowing the chain system to turn round are indispensable. The diverter plates and the intermediate strips may, for example, be T- or L-shaped in cross-section for the overlapping arrangement or to enable them to be fitted into one another. Their width can be larger, smaller or equal to the chain pitch.

According to a preferred embodiment of the invention both the diverter plates and the intermediate strips are smaller than the chain pitch, and several intermediate strips are arranged between two diverter plates. With this arrangement an optimal construction in respect of the unavoidable gaps can be achieved which makes possible an almost closed, circulating table or conveyor plane from which only the narrow diverter strips project. Above all the gaps also remain insignificantly small in the regions of deflection by the chain wheels, which facilitates the delivery of parcels on to a conveyor belt connected directly to the sorting device. The diverter plates and intermediate strips can have any desired cross-section, but it is advantageous in this embodiment to use rectangular or square profiles (beams) for the diverter plates and intermediate strips.

Ends of cross-struts projecting laterally from the chain system can advantageously be formed as roller axles. If the rollers are mounted on the ends of the cross-struts that are already present, no additional axles are required to mount the running rollers.

The course of the trolley-like chain system that is to the greatest possible extent free from abrupt turns can be further improved by providing the chain wheels that are indispensable for driving the conveyor at only one end, preferably only at the outgoing end. The only purpose of the chain wheels is to drive; they deliver the torque. Even in the region of the chain wheels the path of the chain system is defined by the closed, circulating runway on which the chain system is supported through its running wheels.

Each runway can preferably comprise straight, upper strips on the positioning region and lower, curved guide strips opposite these, associated with deflecting and guiding segments mounted at the outgoing end on a drive shaft of the chain wheels and at incoming end on a supporting axle. The trolley-like chain system, of which the endless chains engaging with the chain wheels are defined by follower bushes of the cross-struts, thus only dips into the chain wheels, which are provided with semicircular divisions for engagement with the follower bushes, once in each rotation, while on the opposite side it can roll on to the deflecting and guiding segments without an abrupt transition. The unavoidable movements transferred to the chain system by the chain wheels due to dipping in and out are reduced by half, and with bushes of plastics material are even eliminated almost completely, with a corresponding increase in the life of the chain wheels and of the conveyor system. The deflecting and guiding segments arranged beside and parallel to the chain wheels on the drive shaft and supporting axle respectively can also be used to tension the chain system. The use of follower bushes of plastics material also contributes to noise damping and uniform distribution of the loads and forces.

The curved shape of the runways, which advantageously have an elastic coating, e.g. a noise damping plastics material layer of polyurethane, can be varied in many ways to provide optimal running relationships and conditions; e.g. in the case of an arcuate guide by adjusting the radius. It must be said in advance that the smallest radius of the runway is determined by the pitch of the chain system made up of the diverter plates, coupled together to form trolleys, and the semi-circular recesses in the chain wheels. The arc of the runway adjoining the chain wheels may, for example, be designed so that the impact forces between the flanks of the semi-circular recesses in the chain wheels and the follower bushes of the cross-struts are reduced as far as possible and the noises thereby considerably reduced.

If the radius of the runway is also varied, at least in the section before the chain wheels, an advantageous tangential path can be obtained. By this is meant that the follower bushes engaged by the chain wheels describe a circular path while the middle points of the axles of the subsequent follower bushes move on a tangent to the pitch circle of the chain wheels until they meet the chain wheels. Consequently as the cross-struts enter the region of the chain wheels tangentially from the arcuate guide their follower bushes engage smoothly into the recesses in the chain wheels. In this way the extremely disadvantageous polygon effect that occurs with chain drives can be reduced towards zero.

According to a preferred embodiment of the invention the guide rails that branch into at least two tracks and consequently continue in the conveying direction like a fork are also curved. Since the guide rails which adjust the diverter plates via the followers from their central position to the right or to the left as the chain circulates are curved, and for example bulge out to the left and right, abrupt deflections and otherwise unavoidable impacts such as occur with the known conveyors can be avoided as far as possible. The diverter plates are gradually moved outwards on a curved path so that the articles being conveyed are subjected to only minimal accelerations; long parcels or other articles being conveyed can be aligned and positioned in an improved way and the packaging is protected. Furthermore vibration and noise are reduced.

If a switch arranged before the rail tracks on the incoming side is curved the diverter plates can be transferred at the earliest possible time on to a curved path and thereby smoothly, without an abrupt transition, into the respective rail track.

In the case of a switch that is connected to a servomotor, optimised accelerating and decelerating phases are obtained when pivoting the switch into a new operating position, which also allow it to be moved to intermediate positions, e.g. in the case of rail junctions having more than two tracks.

The guide rails advantageously have a deforming nose facing the switch. Should the switch not yet be aligned with a particular rail track, e.g. because a switching pulse to the servo-motor was too late or a chain trolley with diverter plates ran in awkwardly, and took up an intermediate position, the deforming nose, which advantageously consists of soft plastics material, will always automatically yield and transfer the followers of the diverter plates into a rail track; substantial impacts, jolts or even interruptions can be avoided. If, as is advantageous, the deforming nose is mounted on a swivel plate it need not be directly connected to the rail tracks; deflection can occur due to the mobility of the swivel plate.

Instead of guiding the diverter plates mechanically they can be guided in or on a magnetic rail. This makes it possible to use a contactless, extremely fast switching sequence for sorting or distributing, e.g. when there are more than two rail tracks.

BRIEF DESCRIPTION OF THE DRAWINGS

The invention will now be described in more detail with reference to an exemplary embodiment shown in the drawings, in which.

DETAILED DESCRIPTION OF PREFERRED EMBODIMENTS OF THE INVENTION

Figure 1:
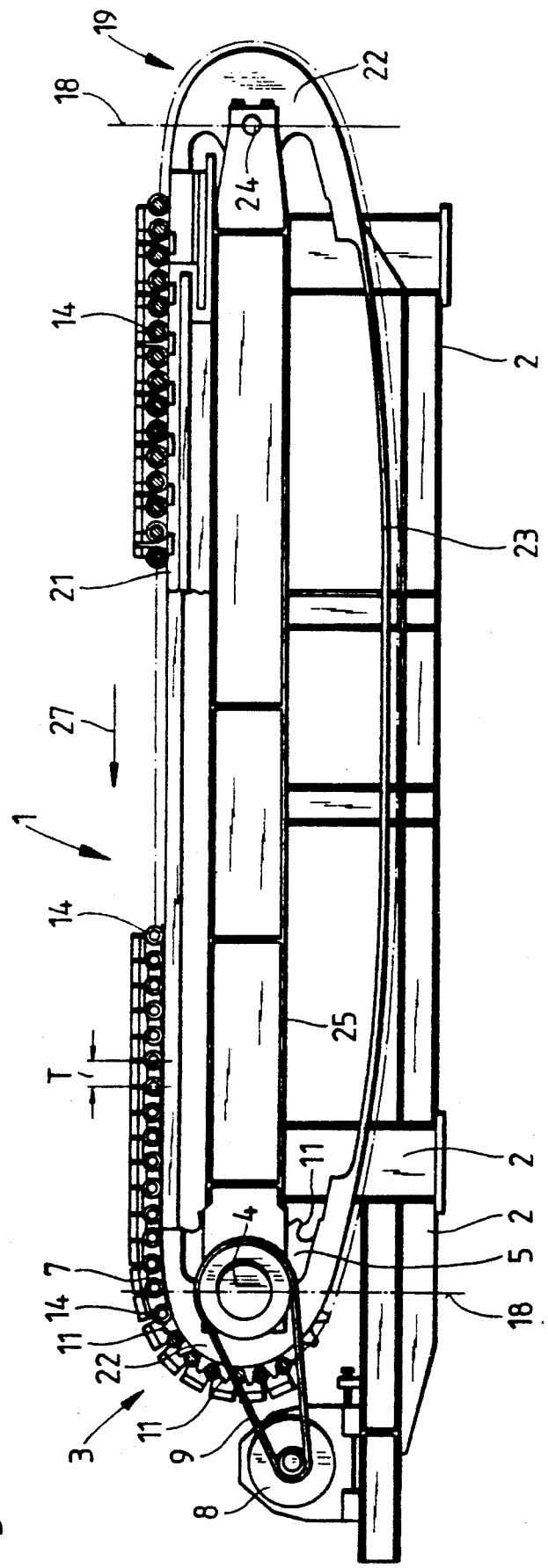
FIG. 1 shows a positioning conveyor according to the invention in side elevation.

A positioning conveyor or conveyed article distributor 1 integrated in a conveyor belt run (not shown) is anchored to the foundations via a supporting frame 2. The conveyor 1 comprises two chain wheels 5 (cf. FIG. 3) arranged spaced apart side by side on a common drive shaft 4 at the outgoing end 3 and has an endlessly circulating chain system 7 in the form of coupled cylindrical tubes 6 having axles for engagement with the chain wheels 5. The torque transmitted via transmission belts 9 to the drive shaft 4 from a drive 8 arranged at the outgoing end 3 is transferred by the chain wheels 5 to the chain system 7, for which purpose the chain wheels 5 have a plurality of semi-circular divisions 11 into which the axles of the cross-tubes 6, which are provided with follower bushes 12 of plastics material, engage (cf. FIGS. 3 and 4). The follower bushes 12 of the cross-tubes 6 thus define the two endless chains of the chain system 7.

Figure 3:
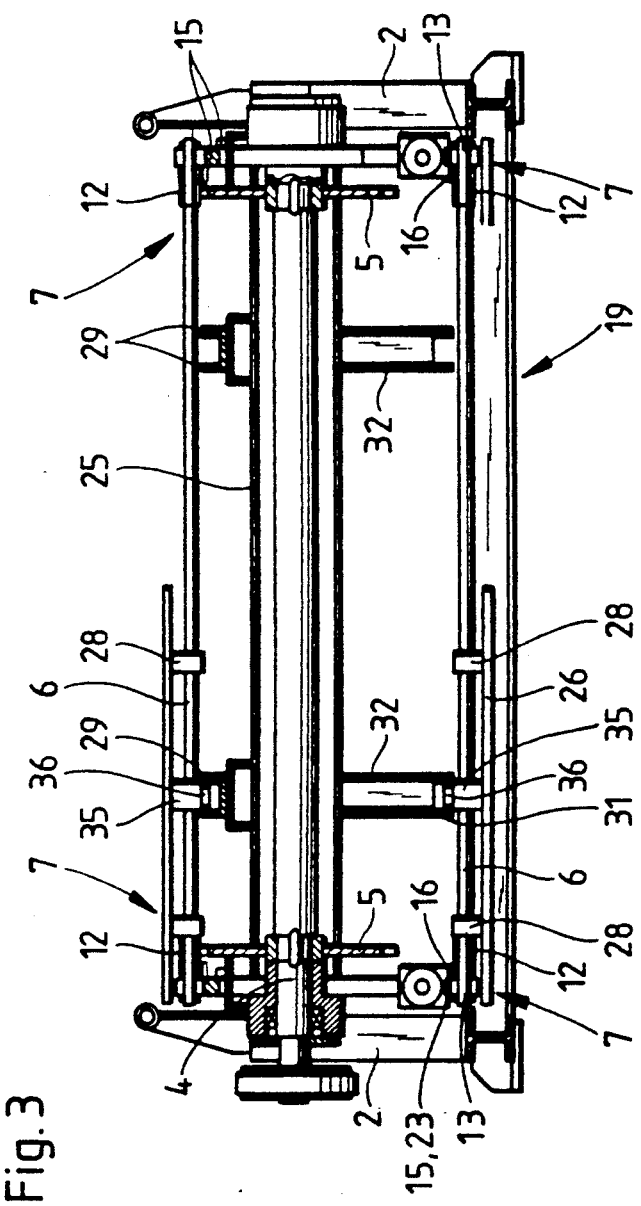
FIG. 3 shows the conveyor of FIG. 2 sectioned along the line III—III.
Figure 4:
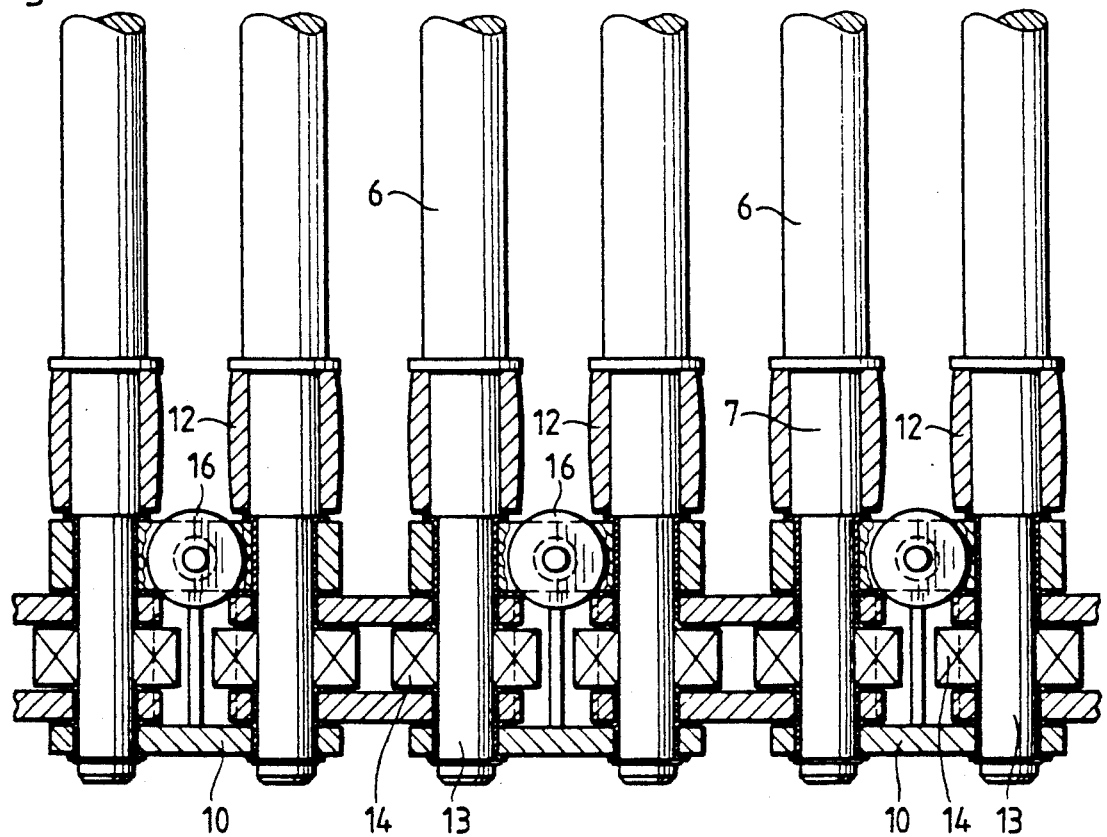
FIG. 4 shows a cutaway view of the conveyor of FIG. 1 from beneath the diverter plates.

The cross-tubes 6 are longer than the distance between the two chain wheels 5 (cf. FIG. 3) and in the chain system 7 the ends of the cross-tubes 6 are formed as roller axles 13 for running rollers 14 (cf. FIG. 3 and 4). The chain system 7 thus has a plurality of running rollers 14 which roll along runways 15. In addition lateral guide rollers 16 are provided which bear laterally against the runways 15. In a positioning region 17 that substantially corresponds to the length of the horizontal carrying run and thus the straight section of the chain system 7 between the vertical centre lines 18 of the turnabouts at the incoming and outgoing ends 19 and 3 respectively (cf. FIG. 1), the runways 15 comprise straight strips 21, deflecting and guiding segments 22 at the incoming and outgoing ends, and curved guide strips 23 opposite the positioning region 17. Both the straight strips 21 and the curved guide strips 23 merge smoothly into the deflecting and guiding segments 22. At the outgoing end 3 the deflecting and guiding segments 22 are arranged, together with the chain wheels 5, on the drive shaft 4, and at the incoming end 19 on a supporting axle 24 which is mounted in a profile frame 25 enclosed by the circulating chain system 7. Thus at the incoming end the chain system 7 rolls on the deflecting and guiding segments 22 without a drive.

Figure 5:
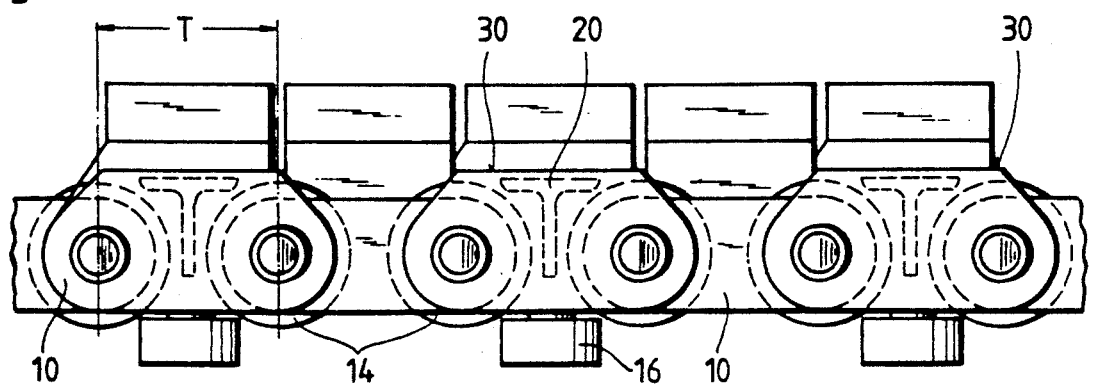
FIG. 5 shows the subject of FIG. 4 in side elevation.

The positioning conveyor 1 has numerous conveyed article distributors (cf. FIG. 2) in the form of diverter plates 26 arranged in succession in the chain system 7 to form an endless, gap-free strip. The conveyed article distributors are about half as long as the distance between the two chain wheels 5 and can be adjusted transversely to the conveying direction 27 (cf. the arrow in FIGS. 1 and 2) by sliding guides 28 (cf. FIG. 3) located on the cross-tubes 6. Adjacent roller axles 13 or cross-tubes 6 are coupled together in pairs by tongues 10 to form trolley-like chain segments or roller units 30 each supported by four rollers 14 (two on each runway) (cf. FIGS. 4 and 5). Tongues 10 opposite one another are connected by T-shaped brackets 20 which brace the chain system 7 across its width. The width of the diverter plates 26 between the pivoting points defined by the roller axles 13 of two adjacent diverter plates 26 corresponds to the chain pitch T (cf. FIG. 1).

Figure 2:
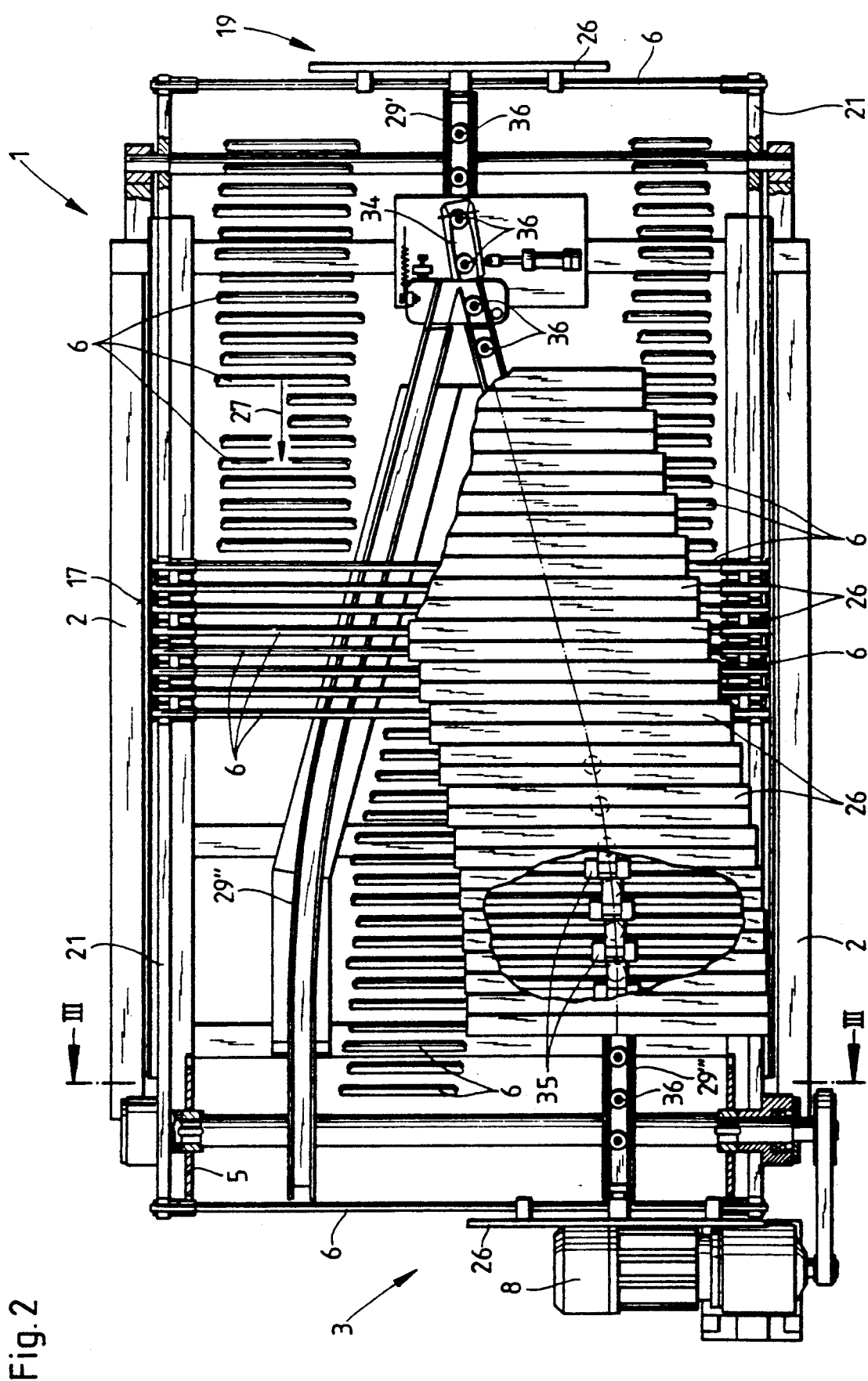
FIG. 2 shows the conveyor of FIG. 1 from above.

To adjust the diverter plates 26 transversely, U-shaped guide rails 29 and 31 (cf. FIG. 3) are arranged in the space enclosed by the circulating chain system 7. Guide rails 29 facing the positioning region 17 are located on the profile frame 25 and guide rails 31 facing the curved guide strips 23 are arranged on supports 32 connected to the profile frame. The course of the upper guide rail 29 associated with the positioning region 17 is shown in FIG. 2. At the incoming end 19 of the conveyor 1 it comprises a straight part 29' which extends in the middle of the conveyor in the conveying direction 27 up to a switch 34 mounted to pivot horizontally. Following the switch 34, shown as an enlarged detail in FIG. 6, the rail forks and merges into two curved rail tracks 29" and 29"' that gradually separate from one another outwards, and the rail tracks 29" and 29"', on reaching the outgoing end 3 of the conveyor 1, run almost parallel to one another and are at the greatest distance from one another. The course of the bottom guide rails 31 corresponds to that of the guide rails 29 or 29', 29" and 29"'.

In the exemplary embodiment shown in FIGS. 2 and 4 each second diverter plate 26 is provided with a follower 35 which has a guide roller 36 at its free end. Alternatively each or only every third diverter plate 26 can be provided with a follower 35; displacing only every third plate 26 enables higher circulating speeds of the conveyor 1 to be achieved than if every second or every single plate 26 is displaced.

When a transported article that is to be positioned, for example, on the right-hand side (viewed in the conveying direction) runs into the positioning conveyor 1 it is taken over by the diverter plates 26 and the guide rollers of the follower or followers 35 (depending on the dimensions of the article) engage in the straight part 29' of the rail 29. The position of the diverter plates 26 relative to their central position in the conveyor 1 (cf. the inlet side 19 in FIG. 2) at first does not change; the transverse adjustment of the plates 26 is initiated only on reaching the switch 34, which is U-shaped in cross-section like the rails 29, 31 and follows a curved course 37 (cf. FIG. 6) so that the followers 35 running from the straight rail part 29' into the switch 34 are received without an abrupt transition. To bring the transported item on to the right side of the positioning conveyor 1 the switch 34 is pivoted prior thereto by means of a signal-operated servo-drive 38 into the position shown in FIG. 2, in which it passes the followers 35 with their guide rollers 36 on into the rail track 29". Owing to the curved shape this transition occurs without abrupt deflections. No accelerating forces are exerted on the transported articles. In the course of further transportation in the conveying direction 27 the diverter plates 26, that are positively guided into the rail track 29" via the followers 35 and their guide rollers 36, are gradually displaced further to the right transverse to the conveying direction, corresponding to the curved course of the rail track 29", whereby the conveyed goods lying on these plates 26 are brought to this side of the conveyor 1 without being subjected to acceleration.

Figure 6:
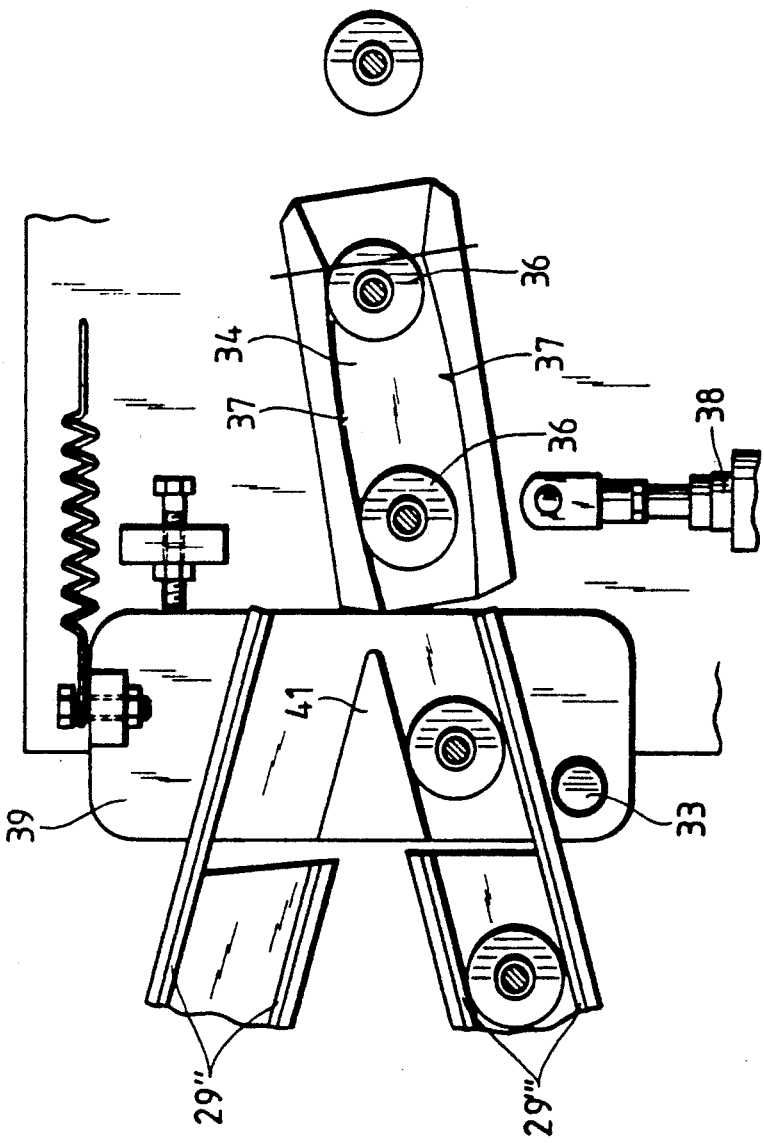
FIG. 6 shows, as a detail, a horizontally pivotable switch arranged before the guide rails for the diverter plates of the horizontal carrying run of the conveyor.

As shown in FIG. 6 in the region where the guide rails fork into the rail tracks 29" and 29"', and thus adjoining the switch 34, a deforming nose 41 which is horizontally adjustable about a pivoting point 33 and preferably consists of soft plastics material is arranged on a swivel plate 39. Should the switch 34 ever take up a central position aligned with the tip of the nose the resilient deforming nose 41 yields on contact with an approaching follower 36. The swivel plate 39 is adjusted and the diverter plate 26 with the transported article is then automatically guided into a rail track 29" or 29"'.

While the transported article, positioned either to the left or to the right, is being delivered at the outgoing end 3 of the positioning conveyor 1 on to the conveyor belt connected thereto, the diverter plates 26, on their way back to the incoming end 19 of the conveyor 1, are guided back to a central position relative to the width of the positioning conveyor 1 by the bottom guide rails 31. They are then—as shown at the incoming end 19 in FIG. 2—again in a central position in which the followers 35 with their guide rollers 36 are guided in the straight rail section 29'. Because the transported articles that are conveyed to the positioning conveyor 1 by means of a conveyor belt arranged before it always maintain a sufficient distance from one another that is continuously and automatically adjusted, e.g. under computer control, corresponding to the dimensions of the transported goods, with the object of attaining the highest possible transporting frequency, there is enough lead time for the switch 34 to distribute or position the articles being transported.

Figure 7:
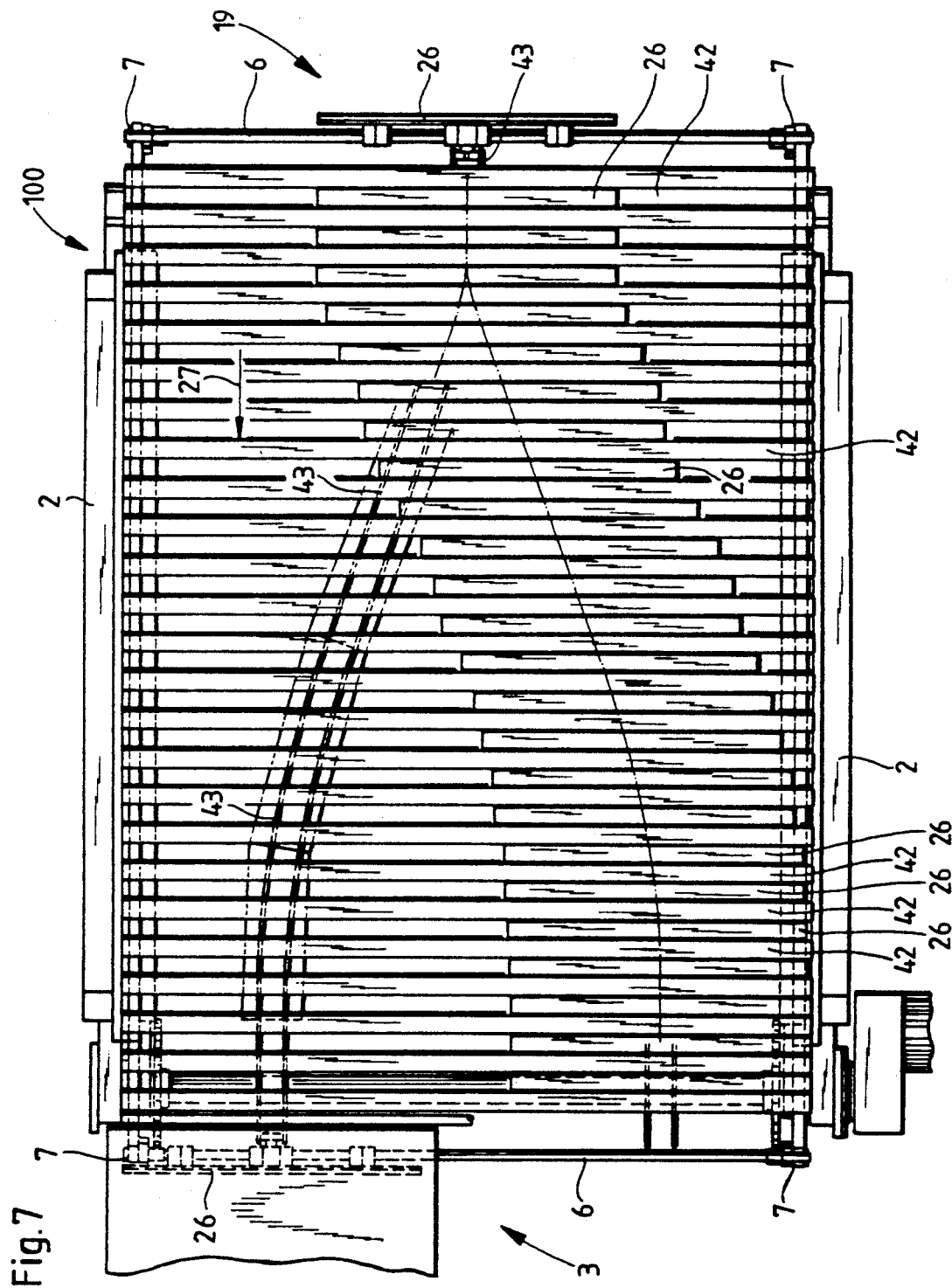
FIG. 7 shows in a plan view a positioning conveyor comprising diverter plates and intermediate strips extending widthwise.

The positioning conveyor or distributor 100 shown in FIG. 7 differs from the conveyor described above merely in that diverter plates 26 alternate with intermediate strips 42 which bridge the whole width of the positioning conveyor 100 are fastened to the chains of the chain system. The intermediate strips 46 are lower than the diverter plates 26 and only the latter thus carry the articles to be transported. Finally the positioning conveyor 100 does not have a switch (cf. FIGS. 2 and 6); instead the diverter plates 26 are guided by a magnetic rail 43.

Figure 8:
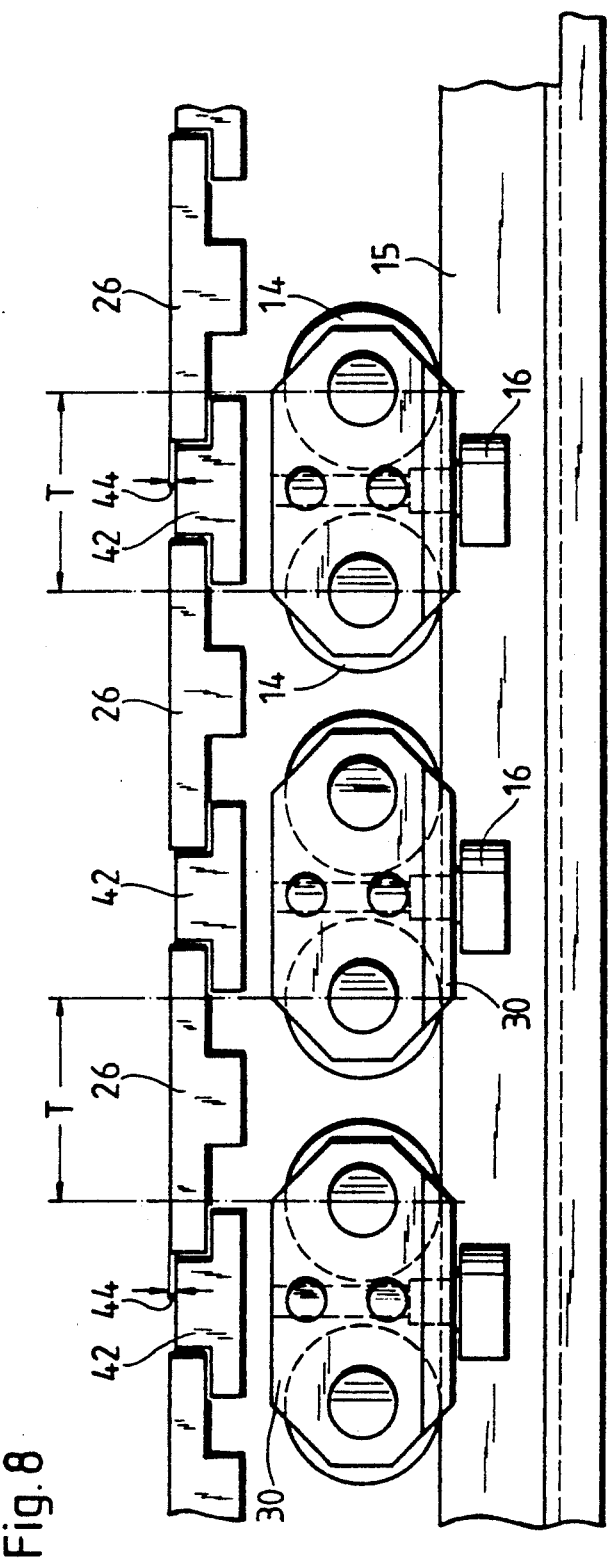
FIG. 8 shows, in side elevation, a cutaway view of a conveyor having diverter plates and intermediate strips arranged so that they overlap one another.

As shown in FIG. 8 the distributor 1 or 100 can have diverter plates 26 and intermediate strips 42 arranged so that they overlap one another; in this case the diverter plates 26 are larger than and the intermediate strips 42 are about equal to the chain pitch T, so that the diverter plates 26 overlap the intermediate strips 42, which are spaced a distance 44 lower and lie below the transporting plane, on both longitudinal sides. The overlapping and fitting in together arrangement is here achieved by giving the intermediate strips 42 and diverter plates 26 a T-shaped cross-section and by rotating their fitting position through 180°. While the diverter plates 26 are each arranged in the transporting plane between two roller units 30, the intermediate strips 42 are in the transporting plane and are each located between two supporting wheels or running rollers 14 of a roller unit 30.

Figure 9:
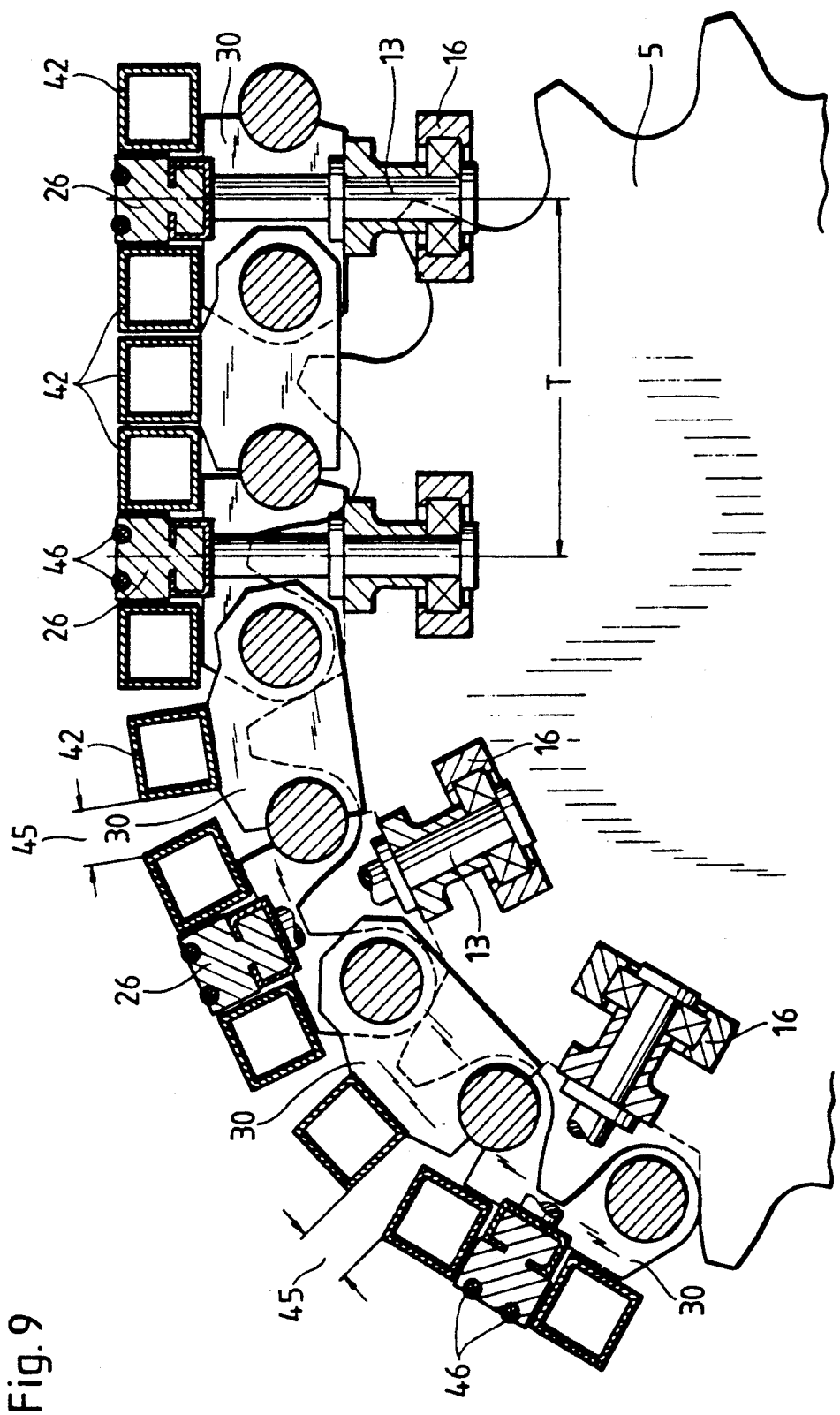
FIG. 9 shows, in side elevation, a cutaway view of the chain wheel region of a conveyor that has diverter plates and intermediate strips in the form of beams that are smaller than the chain pitch.

In the embodiment shown in FIG. 9 the diverter plates 26 and intermediate strips 42 in the form of beams are smaller than the chain pitch T, and between two diverter plates 26, which are here arranged centrally over the roller axle 13 and flanked by two intermediate strips 42, there are three intermediate strips 42 which, after being deflected by the chain wheel 5, form a closed transporting plane. This arrangement minimises the gaps 45 formed during deflection and provides a closed surface in the horizontal plane. By providing friction surfaces (O-rings) 46 in the surface of the diverter plates 26 a higher friction coefficient is obtained, which is advantageous for carrying along the articles being transported.

What is claimed is:

1. A conveyor, in particular a positioning conveyor, having a driven chain systems, wherein said chain system is supported on a closed endless runway, that is, curved except for a straight positioning region; a conveyed article distributor comprising diverter plates; and intermediate strips that extend across the width of said distributor, are attached to the chains of said chain systems, are lower than said diverter plates, and arranged alternatively with said diverter plates.

2. A conveyor in particular a positioning conveyor, comprising:
   a drive shaft;
   two spaced chain wheels supported on said drive shaft;
   a chain system driven over said chain wheels;
   a conveyed article distributor having diverter plates; and
   an endless, stationary, gapless, closed, curved runway for supporting said chain system located internally of said chain system and having a straight positioning region including upper straight strips, the remaining curved portion of said runway including lower curved strips located opposite said upper straight strips, said runway having incoming and outgoing ends, said drive shaft being located at said outgoing end of said runway; and
   said conveyor further comprising a supporting axle located at said incoming end, and two deflecting and guiding segments associated with said runway and supported on said drive shaft and said supporting axle, respectively.

3. A conveyor according to claim 2 wherein said chain system is supported on said runway by rollers.

4. A conveyor according to claim 3 wherein axles of said rollers are coupled together.

5. A conveyor according to claim 4 wherein the axles of said rollers are formed by the ends of cross-struts projecting laterally from said chain system.

6. A conveyor according to claim 2 wherein said runway has an elastic coating.

7. A conveyor according to claim 2 wherein said diverter plates are supported on rollers and the width of said diverter plates between the pivoting points defined by the roller axles of two adjacent diverter plates corresponds to the chain pitch (T).

8. A conveyor according to claim 1 wherein each diverter plate is adjoined by an intermediate strip.

9. A conveyor according to claim 8 wherein said diverter plates and said intermediate strips are arranged to overlap one another on at least one longitudinal side.

10. A conveyor according to claim 9, wherein said diverter plates and said intermediate strips are smaller than the chain pitch (T) and wherein several intermediate strips are arranged between two diverter plates.

11. A conveyor according to claim 2, wherein the surface of the diverter plates is provided with friction surfaces.

12. A conveyor according to claim 2 that includes followers associated with said diverter plates and curved guide rails with which said followers engage to guide said diverter plates.

13. A conveyor according to claim 12 which includes a guide rail branching into at least two tracks.

14. A conveyor according to claim 13, wherein said guide rail includes a curved switch arranged at the incoming end before said at least two rail tracks.

15. A conveyor according to claim 14, wherein said switch is operated by a servo-motor.

16. A conveyor according to claim 14, wherein a resilient deforming nose is arranged at the end of said at least two tracks facing said switch.

17. A conveyor according to claim 16 wherein said deforming nose is mounted on a swivel plate.

18. A conveyor according to claim 3 wherein said diverter plates are guided by a magnetic guide rail.

* * * * *